US010573606B2

(12) United States Patent
Lai et al.

(10) Patent No.: US 10,573,606 B2
(45) Date of Patent: *Feb. 25, 2020

(54) INTEGRATED CIRCUIT SECURITY

(71) Applicant: International Business Machines Corporation, Armonk, NY (US)

(72) Inventors: Kafai Lai, Poughkeepsie, NY (US); Rasit O Topaloglu, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/271,062

(22) Filed: Feb. 8, 2019

(65) Prior Publication Data
US 2019/0172798 A1 Jun. 6, 2019

Related U.S. Application Data

(63) Continuation of application No. 15/662,258, filed on Jul. 27, 2017, now Pat. No. 10,312,200.

(51) Int. Cl.
*G06F 17/50* (2006.01)
*H03K 19/195* (2006.01)
(Continued)

(52) U.S. Cl.
CPC ...... *H01L 23/573* (2013.01); *H01L 21/67282* (2013.01); *H01L 23/544* (2013.01);
(Continued)

(58) Field of Classification Search
CPC ............ G06F 17/5077; G06F 17/5072; G06F 2217/12; G06F 2217/14; G06F 2217/64; G06F 2217/66; G06F 19/00; H03K 19/195; B65D 33/28; B65D 33/16; H01L 23/573; H01L 23/544; H01L 21/67282; H01L 2223/54433
(Continued)

(56) References Cited

U.S. PATENT DOCUMENTS 7,605,081 B2  10/2009 Yang
7,799,568 B2   9/2010 Charles
(Continued)

OTHER PUBLICATIONS

A. Jain et al., "On-line fingerprint verification," IEEE Transactions on Pattern Analysis and Machine Intelligence, vol. 19, No. 4, 1997, pp. 302-314.
(Continued)

*Primary Examiner* — Phallaka Kik
(74) *Attorney, Agent, or Firm* — Jeffrey S LaBaw; Steven J Meyers; Alvin Borremeo

(57) ABSTRACT

Verifying a semiconductor product is disclosed. An image of a self-assembly (SA) pattern on a substrate from a scanner is received. The SA pattern has been initially created using a block copolymer (BCP) which has been annealed on the substrate. Data from the SA pattern is stored in a computer system. The SA pattern data is associated with the semiconductor product. The SA pattern is an information carrying security mark having a set of features with corresponding locations within the information carrying security mark which uniquely identify the semiconductor product.

20 Claims, 10 Drawing Sheets

(51) Int. Cl.
- *B65D 33/28* (2006.01)
- *B65D 33/16* (2006.01)
- *H01L 23/00* (2006.01)
- *H01L 23/544* (2006.01)
- *H01L 21/67* (2006.01)
- *G06F 19/00* (2018.01)

(52) U.S. Cl.
CPC .............. *B65D 33/16* (2013.01); *B65D 33/28* (2013.01); *G06F 17/5072* (2013.01); *G06F 17/5077* (2013.01); *G06F 19/00* (2013.01); *G06F 2217/12* (2013.01); *G06F 2217/14* (2013.01); *G06F 2217/64* (2013.01); *G06F 2217/66* (2013.01); *H01L 2223/54433* (2013.01); *H03K 19/195* (2013.01)

(58) Field of Classification Search
USPC ................ 716/54, 55, 119, 129, 130; 326/8; 283/74, 83, 84; 700/115, 116
See application file for complete search history.

(56) References Cited

U.S. PATENT DOCUMENTS

| | | | |
|---|---|---|---|
| 8,409,449 B2 | 4/2013 | Millward | |
| 8,551,808 B2 | 10/2013 | Marsh | |
| 8,759,976 B2 | 6/2014 | Edelstein | |
| 8,835,581 B2 | 9/2014 | Wu | |
| 9,349,604 B2 | 5/2016 | Rathsack | |
| 9,418,860 B2 | 8/2016 | Somerveil | |
| 9,478,429 B2 | 10/2016 | Ghariehali | |
| 10,255,298 B2 * | 4/2019 | Belledent | G16C 20/70 |
| 10,312,200 B2 * | 6/2019 | Lai | H01L 23/573 |
| 2005/0267971 A1 | 12/2005 | Fritz | |
| 2010/0137496 A1 | 6/2010 | Millward | |
| 2010/0195916 A1 | 8/2010 | Blondiaux | |
| 2011/0250745 A1 | 10/2011 | Millward | |
| 2013/0284807 A1 | 10/2013 | Fullerton | |
| 2014/0265025 A1 | 9/2014 | Van De Veerdonk | |
| 2014/0273290 A1 | 9/2014 | Somerveil | |
| 2015/0339429 A1 | 11/2015 | Zou | |
| 2016/0342592 A1 | 11/2016 | Belledent | |
| 2017/0194356 A1 | 7/2017 | Cheng | |

OTHER PUBLICATIONS

H. Ito, "Chemical amplification resists: History and development within IBM," IBM Journal of Research and Development, vol. 41, No. 1-2, 1997, pp. 69-80.

Z. Xiao et al., "Directed self-assembly (DSA) template pattern verification," Proceedings of the 51st Annual Design Automation Conference, 2014, 6 pages.

IBM Patents or Patent Applications Treated As Related.

* cited by examiner

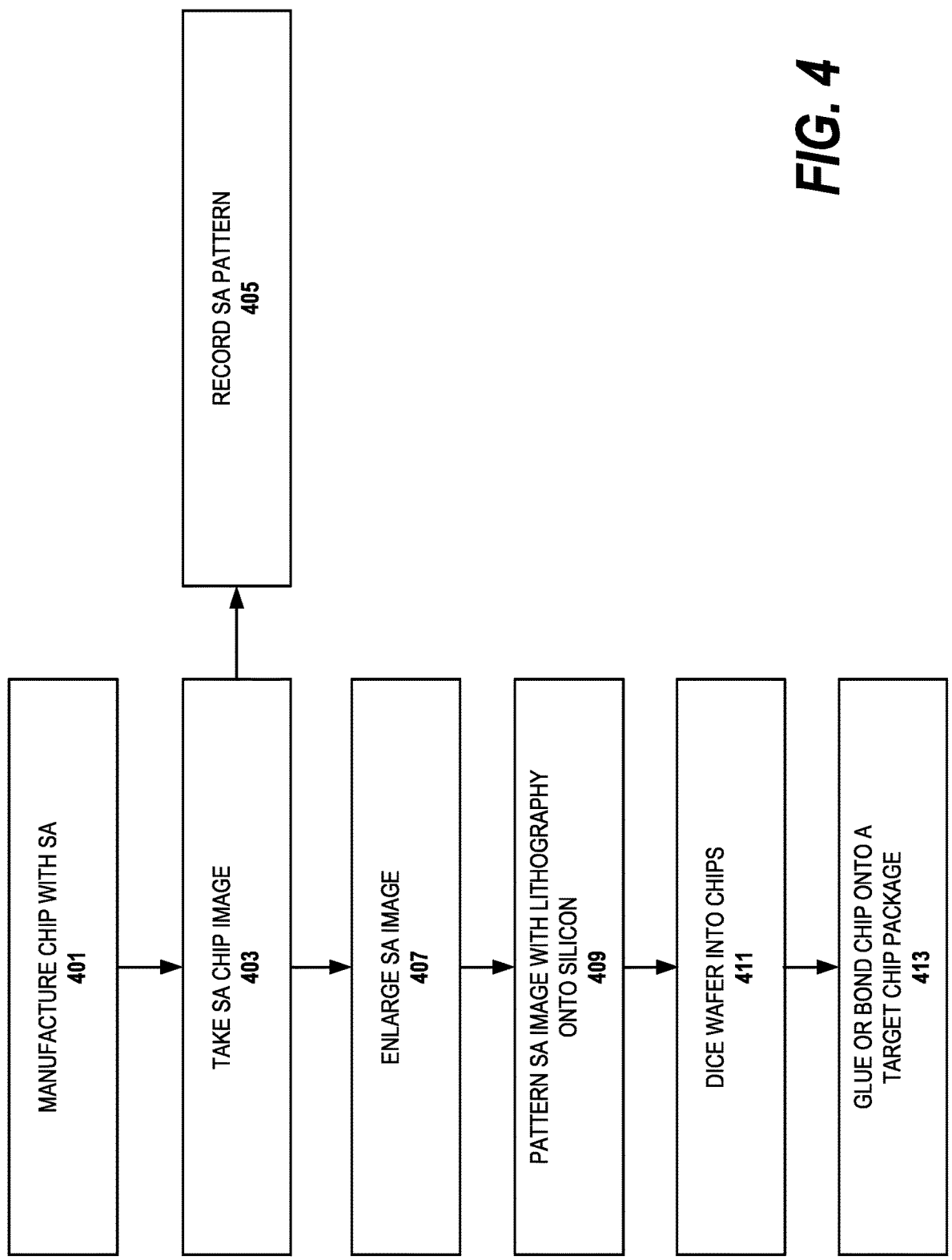

INTEGRATED CIRCUIT SECURITY

BACKGROUND OF THE INVENTION

This disclosure relates to integrated circuit devices, and more specifically, to a method and structure to protect integrated circuits used in semiconductor devices.

Circuit counterfeiting is a major loss of revenue and reputation for integrated circuit manufacturers. A circuit design can be stolen by reverse engineering or other means such as access to mask sets and hacking into design databases. The stolen circuit design is then manufactured at a lower quality foundry and parts are sold as if produced by the original integrated circuit manufacturer. Lower grade parts are used in critical electronic systems and cause dramatic failures. It has been estimated that one percent of semiconductor devices are counterfeit units. With the move to IoT devices, with less complexity in integrated circuits, circuit counterfeiting is projected to become a greater problem.

There has been recognition of the problem. The solutions to date have mostly been limited to the use of security markings, e.g., using special security ink on packages. With a special security ink, the manufacturer will print some data such as a numeral, bar code or other marking. Typically, the markings will include data such as part number, serial number, data codes and logos. Various ink options are available such as visible fluorescent inks, invisible fluorescent inks, UV invisible inks, IR invisible inks or UV long/short wave inks. A problem, however, is that the printed data and ink are not unique and it is relatively easy to identify and reproduce a naming scheme or bar code identification. Those engaged in counterfeiting devices are becoming more skilled and well financed, and can gain access to the requisite ink and data for counterfeiting purposes.

The present disclosure presents an advanced integrated circuit security approach to alleviate this problem.

BRIEF SUMMARY

According to this disclosure verifying a semiconductor product is disclosed. In an embodiment of the invention, an image of a self-assembly (SA) pattern on a substrate from a scanner is received. The SA pattern has been initially created using a block copolymer (BCP) which has been annealed on the substrate. Data from the SA pattern is stored in a computer system. The SA pattern data is associated with the semiconductor product. The SA pattern is an information carrying security mark having a set of features with corresponding locations within the information carrying security mark which uniquely identify the semiconductor product.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings which are not necessarily drawing to scale, and in which:

FIG. 4 is a flow diagram for using an SA process to mark an integrated circuit according to a third embodiment of the invention;

DETAILED DESCRIPTION OF THE DRAWINGS

At a high level, embodiments of the invention increase security through a unique self-assembly (SA) pattern or "fingerprint" that is created onto selected chips, chip locations and processing layers. An unguided SA process is used to generate random and unique patterns which the invention uses for integrated chip security. Once created, the unique SA patterns are captured, analyzed, transformed and enlarged in embodiments of the invention. The enlarged versions of the SA patterns allow easier customer verification. In embodiments of the invention, rather than verifying against an entire image of the SA pattern, a set of features and feature locations are used to efficiently store and recognize each unique pattern. Embodiments of the invention utilize SA patterns attached to chips or packaging during manufacturing.

Embodiments will be explained below with reference to the accompanying drawings.

Figure 1:
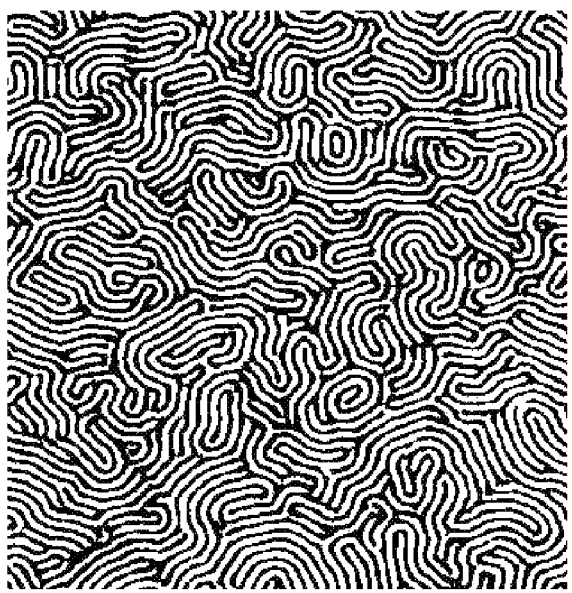
FIG. 1 is a representation of a self-assembly (SA) pattern on a substrate according to a first embodiment of the invention.

FIG. 1 is a top view diagram depicting a self-assembly (SA) pattern according to a first embodiment of the invention. An alternate term used in the specification is unguided self-assembly (USA). Directed self-assembly (DSA), as used in semiconductor manufacturing, is a guided process in which the formation of lines or other structures are guided either through chemical or graphoepitaxy techniques. In chemical or chemoepitaxy techniques, a chemically patterned surface with different chemical properties in different areas is laid down on the substrate and a block copolymer (BCP) is applied. The chemical pattern induces the BCP to form a pattern which is then "annealed" using either a thermal or solvent based process. A block copolymer is made up of two types of chemically incompatible polymeric blocks which separate to form nanostructures. In graphoepitaxy techniques, permanent or temporary topographical features are patterned on or into the substrate, e.g., by using lithographic techniques, which are mimicked by the BCP once annealed. DSA is used to create straight lines or other desired shapes in the integrated circuit. DSA is frequently employed at nanoscale to fabricate features smaller than the features made by conventional optical lithography.

If no guidance is provided, the directed self-assembly becomes self-assembly (or unguided SA) which results in substantially random patterns. By "substantially random", the inventors mean unpredictable patterns, e.g., where features in the patterns have statistically random locations in the overall pattern. The inventors recognized that these patterns are complex and in some ways resemble human fingerprints. Further, in the inventors' experience, each of the patterns is unique as compared to any other pattern. The patterns are thus "non-clonable" and impossible to calculate as they utilize the inherent randomness of an unguided SA process.

In some preferred embodiments of the invention, a block copolymer (BCP) material is used in as unguided SA process to create an identifying SA pattern or "fingerprint". In embodiments of the invention, a pattern such as that shown in FIG. 1 is created using a self-assembly process. Because of its random qualities, each SA pattern is a unique "fingerprint" which is used by the invention to uniquely identify a chip or package on which the SA pattern is created. The pattern itself is comprised of one of the polymers in the BCP, or is a transferred, etched pattern of the SA pattern in an underlying material such as a metal or a semiconductor. Referring to FIG. 1, the black portion of the pattern is the polymer which remains of the chip level, while the white portion of the pattern is where the second polymer was present before being removed by the BCP process. Or, in alternative embodiments, the black color of the pattern represents the material of the chip level which was under the BCP pattern. The white portion is the etched pattern of the BCP pattern (i.e. etched into the material of the chip level and potentially into a second underlying material to provide visual contrast) where the second polymer was removed prior to an etch step.

In preferred embodiments of the invention, the pattern is created in one or more allocated layers of the semiconductor chip in one or more allocated areas of the chip. In some embodiments of the invention, the chip is a normally functioning integrated circuit chip. In other embodiments of the invention, the chip is a special purpose SA pattern chip whose purpose is to identify the package in which it is incorporated, typically with other functional chips. If an SA pattern is etched into a dielectric layer, a metal deposition step followed by chemical-mechanical polishing may be utilized to generate final pattern of alternating metal vs dielectric lines (looking top-down). This would only be used for on-chip (not on-package) embodiments and have advantages in imaging due to material contrast between metal and dielectric portions. In embodiments in which the pattern is created in certain layers of the chip, preferably the layer would be in the layers near the surface of the chip so that they can be detected and imaged more easily.

In embodiments of the invention, a set of SA patterns are used to identify a chip or a package in which chips are incorporated. Multiple SA patterns are used in a single chip in some embodiments. In other embodiments, a single SA pattern is associated with each chip and the set of single SA patterns is associated with the package in which the chips are incorporated. In yet other embodiments, some of the chips have SA patterns while others do not in a given package. In many preferred embodiments of the invention, the SA pattern created in a chip is replicated on the package, possibly in an enlarged form to facilitate verification.

In some embodiments of the invention, the single or multiple "fingerprints" in every shippable chip are recorded before packaging and stored in a secure database owned by the manufacturer. In other embodiments of the invention, the SA patterns in the one or more chips incorporated into a particular package are recorded after packaging and stored in the secure database and associated with the package. In yet other embodiments of the invention, the image of an SA pattern created on one chip is captured and then enlarged and reproduced on the packaging or on a special purpose SA chip and then recorded and stored in the secure database. In an embodiment of the invention, the SA information is combined with other markings, e.g., model and serial numbers, bar codes, date of manufacture, to identify the chip or package.

For customer validation, one or more chips or packages from a received batch are sampled and its SA patterns are observed. The observed SA patterns are validated against a database owned by the manufacturer. As mentioned elsewhere, in some preferred embodiments, a least one of a set of SA patterns is enlarged on the packaging for validation and verification purposes. In other embodiments, SEM or optical microscopy is used to verify the SA pattern according to the chip location and chip level on which the pattern is recorded in the database to be present.

Embodiments of the invention provide a system and a method for storage and validation of the fingerprint for compactness and speed.

The recognition of an SA pattern can rely on some of the techniques for encoding fingerprints as fingerprint algorithms are a well-known art. However, certain differences between SA patterns and human fingerprints exist and can be accounted for in the recognition algorithm used by embodiments of the invention. In actual human fingerprints, most of the complexity of the human fingerprint pattern is concentrated towards the center of the fingerprint pattern. Also, the area of interest where features occur when compared to the feature pitch is much smaller in a human fingerprint than in an SA pattern. That is, generally speaking, there are fewer whorls in a human fingerprint as compared to features in an SA pattern in some preferred embodiments of the invention. Thus, the same algorithm used to compact human fingerprint information is not equally efficient for an SA pattern recognition process.

In these embodiments, the "care points" of interest are not exactly the same as those in the human fingerprint recognition process. Care points in human fingerprint recognition are based on innate human characteristics, including the defining locations of features such as arches, loops and whorls of the fingerprint. The field directions of the lines surrounding the care points are typically part of the information stored for human fingerprint recognition. As the SA patterns are the result of the chosen manufacturing process, and are typically more complex than a human fingerprint, different algorithms define what features distinguish respective SA patterns. In one embodiment of the invention for example, the system stores only the center locations of features, but not field directions of lines surrounding the center location as would be typical in a human fingerprint recognition process. Because there are more features in an SA pattern, storing and verifying only the center locations can distinguish between SA patterns in a more efficient way than storing and verifying both center locations and field directions.

Figure 2:
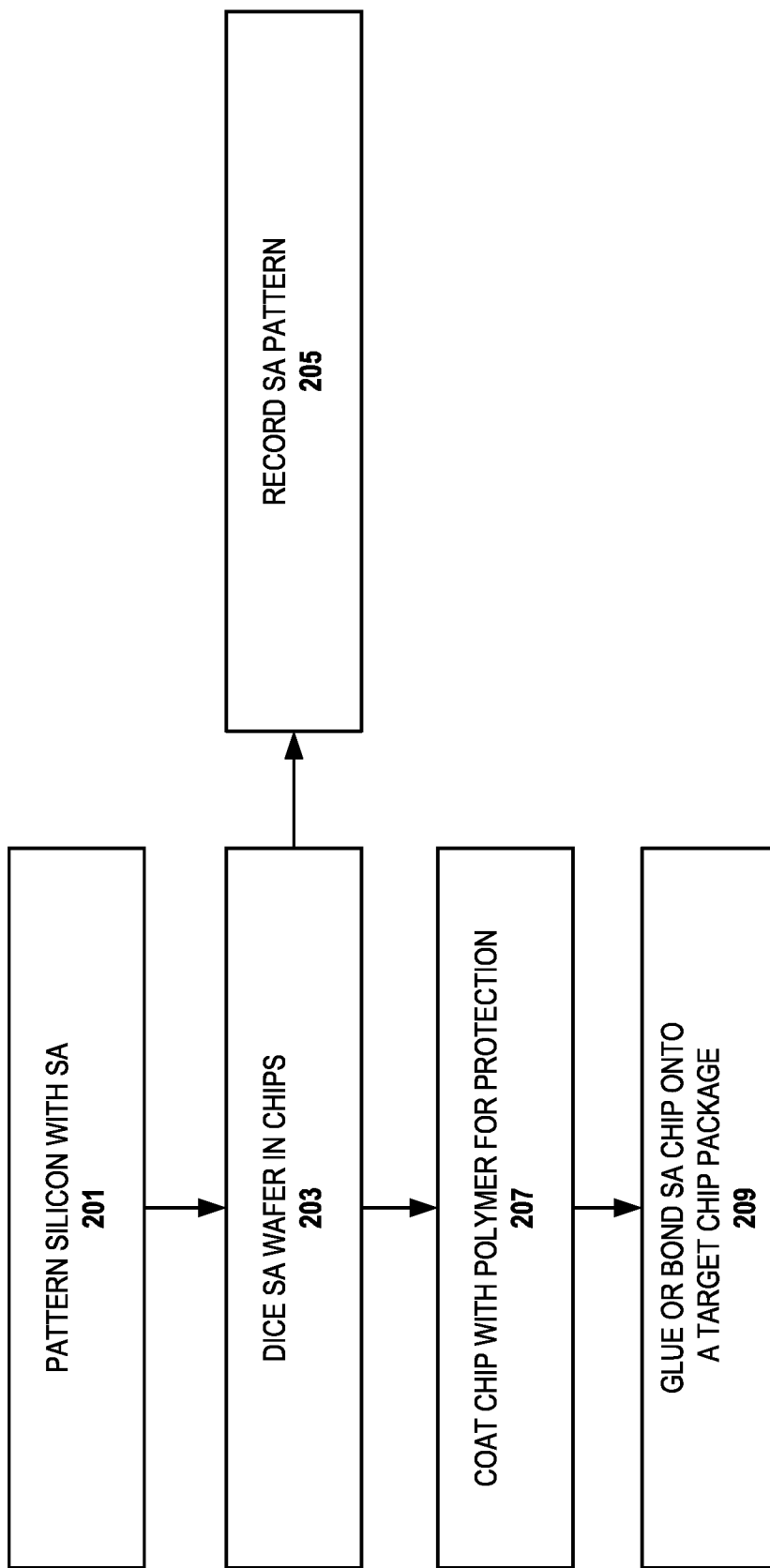
FIG. 2 is a flow diagram for using an SA process to mark an integrated circuit according to a first embodiment of the invention.

FIG. 2 is a flow diagram for using SA to mark an integrated circuit according to an embodiment of the invention. In this embodiment, an SA pattern is printed on a chip substrate material such as silicon. In step 201, the silicon chip is patterned with an SA process in wafer form. Once the SA pattern is made, and the remaining steps (if any) of the integrated circuit processing are completed, the wafer is diced into individual chips in step 203. At least some of these chips have one or more unique SA patterns. At this point, in some embodiments, the SA patterns and their locations on the chips are scanned, features extracted and recorded in the database, step 205. To scan the nanoscale SA pattern, tools such as Scanning Electron Microscopy (SEM), Scanning Ion Beam Microscopy and nanoscale optical microscopy, both far-field and near-field techniques, are used to scan the SA pattern in embodiments of the invention. A camera is used in some embodiments of the invention and the image captured by the camera is analyzed for the SA pattern features.

As shown, in step 207, the process continues where the chip is coated with a polymer for protection. Depending on the opacity of the polymer, the scanning and recording step is performed after this step in alternative embodiments.

In step 209, the coated chip is glued or otherwise bonded on to a target chip package. If multiple SA marked chips are incorporated into the same package, multiple recorded SA patterns from step 205 are associated with the target chip package in some embodiments. In yet other embodiments, depending on the placement of the SA patterns relative to the packaging and orientation of the chip, the scanning and recording step could occur after the assembly of the target chip package.

In preferred embodiments of the invention, the entire SA pattern is not stored in the database. Instead, an algorithm is used to pinpoint the location of features in the SA pattern so that the pattern can be described in a compact, efficient way. The features, or "extracted minutiae", can be categorized by feature type, e.g., as a line-end, a fork or a short-line feature. Other types of features such as whorls, loops or arches may be selected in the particular embodiment. The process of feature extraction can include smoothing filter, orientation field estimation and ridge extraction steps. Bitwise image operations are utilized to identify different minutiae in some embodiments. In a preferred embodiment, these minutiae are stored efficiently using a sparse matrix representation. Embodiments of the invention use the input feature list to verify a chip or package against a SA pattern database using an elastic string match utilizing an edit distance metric to compare a stored feature and feature location with the scanned values.

Because of the much larger information content, i.e. number of features, in a SA pattern than a human fingerprint, a more concise way of storing data is possible and preferred in a memory-limited system like IoT devices. For example, in one embodiment of the invention, only a single type of feature, e.g., a line end, is scanned, located and stored. When a customer scans the chip for verification only that type of feature is used in the verification process. Alternatively, the customer can scan for all types of features, but the manufacturer will only use the line end features to verify the chip or package. Not informing the customer which feature is used improves the security of the verification, while allowing the manufacturer to save storage space and processing time. Rotating the feature used on a periodic basis, e.g., line end on Mondays, fork on Tuesdays, will further improve security while still allowing the storage space and processing time. A single type of feature would not normally be sufficient to identify a human fingerprint. However, as there are many more features in an SA pattern to choose from, it will be sufficient in embodiments of the invention to positively verify an SA pattern.

Figure 3:
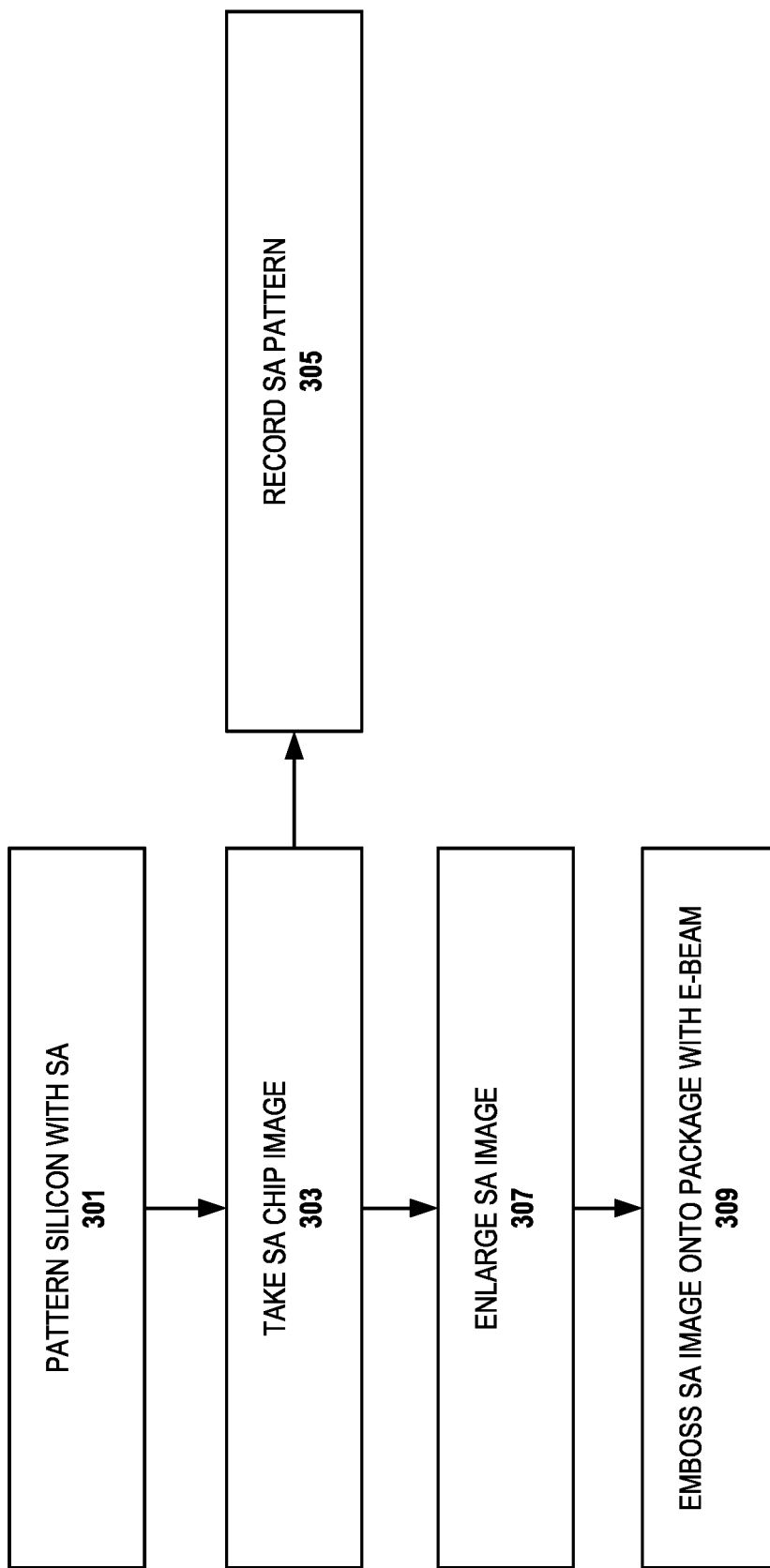
FIG. 3 is a flow diagram for using an SA process to mark an integrated circuit according to a second embodiment of the invention.

FIG. 3 is a flow diagram for using an SA process to mark an integrated circuit according to a second embodiment of the invention. In this embodiment, one or more SA patterns produced on the semiconductor chip are reproduced on the packaging. The process begins similarly to that depicted in FIG. 2; in step 301, the silicon chip is patterned with an SA process in wafer form. Once the SA pattern is made, and the remaining steps of the integrated circuit processing are completed, the wafer is diced into individual chips. At least some of these chips that have one or more unique SA patterns are scanned in step 303 (either before or after wafer dicing) to take an image of the SA pattern. The SA patterns and their chip locations (if recorded) are recorded in the database, step 305.

In step 307, the chip(s) is packaged according to the manufacturing process. For example, an opaque black plastic packaging is used in some embodiments. In step 309, the SA pattern is retrieved from the database and enlarged to make the SA pattern easier for the customer to scan on the packaging in a verification process. In the form created on the original chip, the SA pattern is very small, i.e. the features are nanometers wide, and required expensive imaging equipment to discern one SA pattern from another. By enlarging the SA pattern, less expensive equipment is needed by the customer to verify the authenticity of the package. The enlarged SA pattern as well as any other desired markings can then be embossed onto the packaging by e-beam or laser beam, step 311. Other desired markings include model and serial numbers, date codes and manufacturer logos in some embodiments of the invention. Other embodiments of the invention use different marking techniques to create the enlarged image on the package. In an alternative embodiment of the invention, the enlarged pattern is the inverse of the SA pattern on the chip.

FIG. 4 is a flow diagram for using SA to mark an integrated circuit according to a third embodiment of the invention. In this embodiment, one or more SA patterns produced on a semiconductor chip are reproduced on other chips using lithography. Because the SA pattern is complex, portions of the original SA pattern can be reproduced and still maintain a unique partial pattern. So in some embodiments of the invention, a portion of the created SA pattern is enlarged on the packaging. The process begins similarly to that depicted in FIGS. 2 and 3. In step 401, the silicon chip is patterned with an SA process. Once the SA pattern is made, the original, unique SA pattern is scanned and features identified in step 403. The original unique SA pattern is recorded in the database, step 405, either in the full pattern form or in a set of features and their locations in the SA pattern.

The SA pattern, or a portion thereof, is then enlarged in step 407 to provide easier authentication at the customer. The enlarged SA pattern is then used to pattern other chips on a wafer using conventional lithography and etch processes in step 409. These chips are called enlarged SA pattern chips. If a portion of the SA pattern is used in the enlarged SA pattern, in some embodiments, location information is stored in the database indicating where the portion is located within the entire pattern.

In some embodiments, the enlarged SA pattern chips are on the same wafer as the original chip on which the SA pattern was originally fabricated; in other embodiments, they are on a different wafer. In embodiments of the invention where a portion of the original SA pattern is used, it is possible to use other portions of the pattern for respective enlarged SA pattern chips.

In embodiments of the invention, the original SA pattern is created on a dummy, nonfunctional chip, and is solely used for producing the pattern which is subsequently enlarged on the enlarged SA pattern chips. In these embodiments, the enlarged pattern does not represent an SA pattern on a functional chip in the package. However, the inventors recognize in many cases, the customer will be uninterested in verifying both the enlarged SA pattern and the original, nanoscale SA pattern.

In some embodiments, as part of the enlargement process, the patterns are digitally manipulated, e.g., to provide greater contrast, inverting the image or cutting portions of the original pattern. These manipulations are reflected in the data stored in the database so that the customer can identify the pattern. As part of the manipulation, registration marks can be added to the SA pattern to enable the customer to more quickly identify feature location in the verification process.

The types of materials chosen for patterning is dependent on the implementation of the invention. In embodiments of the invention where the enlarged SA pattern chip is a functional chip or is fabricated alongside functional chips, the materials chosen for the enlarged SA pattern need to be compatible with the particular layer of the chip in which they are fabricated. In nonfunctional enlarged SA pattern chips, the primary criterion is to choose materials with a good contrast for the verification step at the customer. Exemplary material layers with good optical contrast for optical detection are dielectric (silicon dioxide or nitride) vs. metal (Al or Cu). So the etch would through a first layer, e.g., a metal layer, or reveal the second layer, e.g., a dielectric layer, below.

Next, the wafer is diced into individual chips in step 411. Because the pattern is already known at the time of patterning, as it is based on the original SA pattern, there is no need to take another scan and record the respective SA patterns of the individual chips, so long as the order of the chips is retained during further handling. This embodiment is advantageous in a semiconductor process where the lithography and etch steps are used in the final process steps so the SA pattern is easily seen for verification purposes. Using durable materials eliminates the need for the protective layer, and can be used in chips having a manufacturing process in which the process steps which build the unguided SA pattern would be difficult or undesirable to implement.

The process continues in step 413 where the SA patterned chips are glued or bonded onto a target chip package. The SA pattern is associated with the package in the database storage in some embodiments of the invention. In alternative embodiments, the association of the SA pattern with a particular chip is sufficient for verification.

Figure 5A:
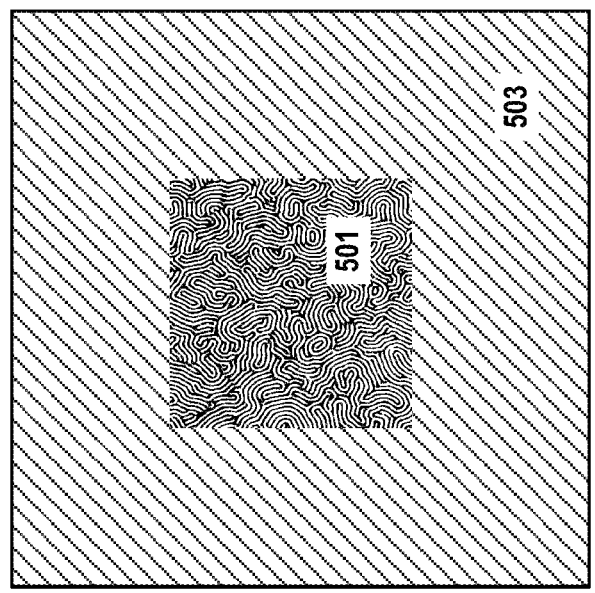
FIGS. 5A and 5B are respectively top and cross-sectional diagrams depicting an SA structure used for marking a chip package in an embodiment of the invention.
Figure 5B:
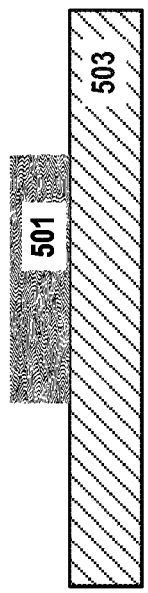

FIGS. 5A and 5B are respectively top and cross-sectional diagrams depicting an SA structure used for marking a chip package in an embodiment of the invention. The SA marked chip 501 is glued or otherwise bonded onto a target chip package 503. Although for ease in illustration, the SA pattern is depicted as covering the entire chip area, in some preferred embodiments, the SA pattern is produced only on designated areas of the chip 501. Although a single chip is shown in the figure, in other embodiments, multiple SA marked chips can be placed on the same package.

Figure 6:
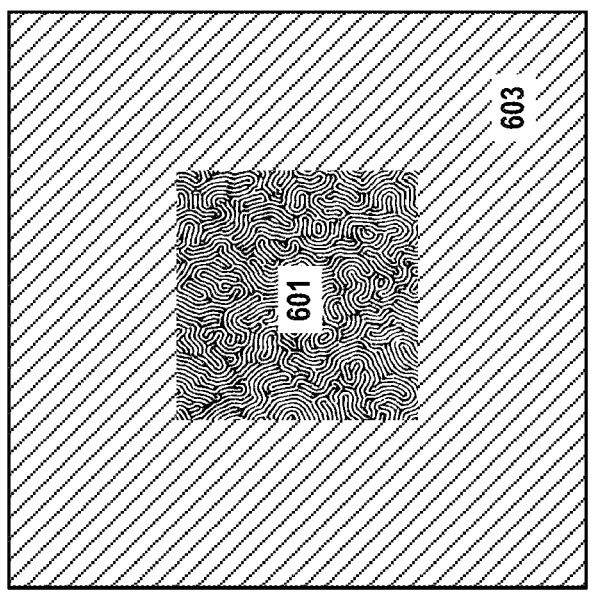
FIG. 6 is a top view diagram depicting an SA structure incorporated into an integrated circuit chip in an embodiment of the invention.

FIG. 6 is a top view diagram depicting an SA structure incorporated into an integrated circuit target chip package in an embodiment of the invention. In this embodiment, the SA pattern 601 is produced directly on the target chip package 603 to be secured. As mentioned above, an enlarged SA pattern 603 is embossed, etched, patterned or otherwise created onto package directly so can be easily detected by optical tools. The enlarged SA pattern can be based on one or more SA patterns made on the integrated circuit chips (not shown) inside the package 603.

Figure 7:
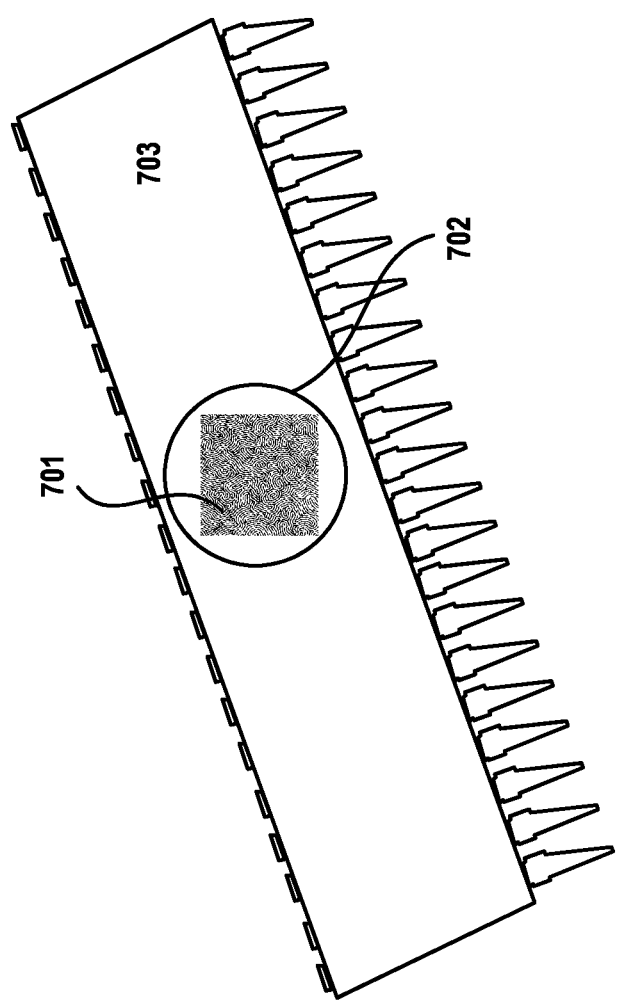
FIG. 7 is a perspective view diagram depicting an SA structure incorporated into IC packing in an embodiment of the invention.

FIG. 7 is a perspective view diagram depicting an SA structure incorporated into IC packaging in an embodiment of the invention. This illustration shows an SA patterned chip 701 visible through a window 702 in an IC package 703, e.g., similar to the openings in erasable programmable read-only memory (EPROM) packaging. In alternative embodiments, an enlarged embossed, etched or e-beamed pattern is visible through the top of package.

Figure 8:
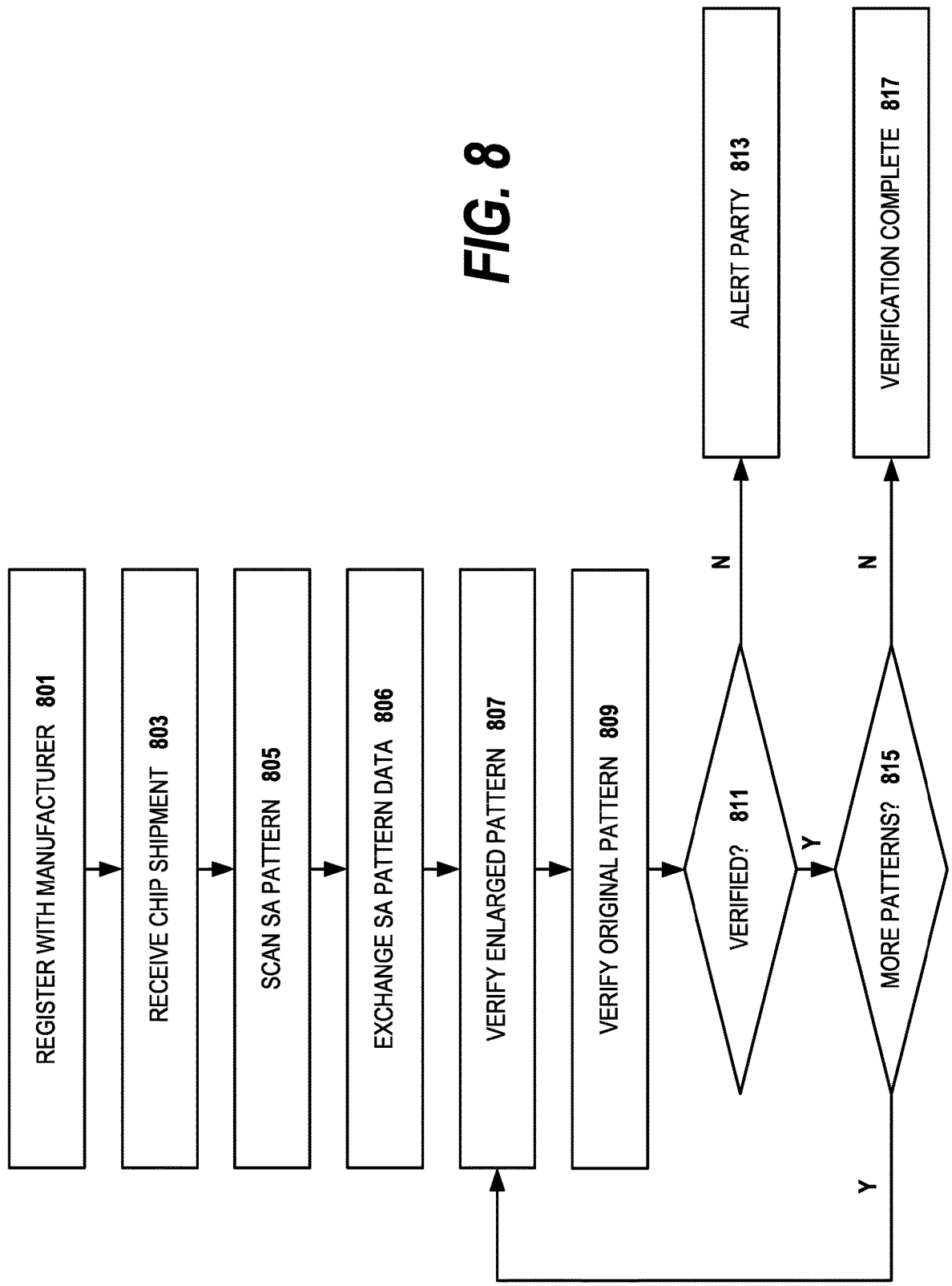
FIG. 8 is a flow diagram using an SA marked integrated circuit to determine its authenticity in a verification operation.

FIG. 8 is a flow diagram using an SA marked integrated circuit to determine its authenticity in a verification operation. The illustrated process is merely exemplary and one skilled in the art would recognize that many variations to the process are possible, the process steps may take place in a different order, with additional or fewer steps taken in alternative embodiments and within the scope of the invention.

The process begins in step 801 where the customer registers with the manufacturer to receive the SA pattern data from the manufacturer. As the information is highly sensitive, and the manufacturer does not want pirate foundries obtaining it, the inventors envision that a security handshake between the manufacturer and customer using PKI certificates or similar security measures is part of the registration process. As represented by step 803, the customer receives a chip shipment from the manufacturer containing chips and/or packaging which has been marked with the SA pattern of the invention. The shipment can have order number or customer number information useful to request and receive the SA pattern data from the manufacturer. The packing information can contain instructions such as a unique URL and code for retrieving the information. Alternatively, more sophisticated means for retrieving the SA pattern data could be employed in an embodiment of the invention.

In step 805, the customer scans the first SA pattern, e.g., with an optical scanner like those used for bar codes or QR codes. A camera is used in alternative embodiments. The level of detail of the verification process is left up to customer preference in preferred embodiments. If the parts are shipped directly from the manufacturer and the customer has reason to believe that there has been no tampering, a spot check of a few randomly selected chip package will suffice. If, however, the parts come via a third party distributor or there is reason to doubt their provenance, a more extensive scan and verification process is undertaken, possibly scanning each chip or package. The scan can also include both the enlarged SA patterns and at least some of the original SA patterns on the chips themselves. Where more extensive verification is undertaken, the SA pattern information from the manufacturer will also be more extensive, including the location of the chip in the package containing the original SA pattern, the location of the SA pattern on the chip, the layer on which the SA pattern is to be found and so forth.

In step 806, the SA pattern data is exchanged between the customer and the manufacturer. In preferred embodiments of the invention, the SA patterns are stored in a compressed manner where the features, the feature type and feature location are stored, rather than the entire image. This is much more efficient for storage and transmission of the pattern information. In embodiments of the invention, the SA pattern information is correlated to chip and/or package number, customer information. As mentioned elsewhere, the SA pattern data includes chip location and level information in embodiments of the invention to help the customer locate the SA pattern as well as identify counterfeit chips which include the SA pattern at incorrect locations on the chip or packaging. The location of registration marks, if any, are also included in embodiments of the invention.

In preferred embodiments, the SA pattern data is not transmitted to the customer. Instead, the customer scans the SA pattern and sends the results, e.g., feature and feature location data, back to the manufacturer for verification. The manufacturer will respond back to the customer whether the SA pattern matches one in the batch of parts which was shipped to the customer, or whether it is a valid pattern for that part number. The inventors believe that for improved security, the customer should send the scanned SA pattern data to the manufacturer for verification rather than have the manufacturer transmit the SA pattern data to the customer to verify shipment of chips or packages. Otherwise, counterfeit manufacturers can also send counterfeit information to customer to check against. Serial numbers of chips are preferably sent to the manufacturer along with the read SA patterns. Without a serial number, checking against a large batch of chips may unduly tax the manufacturer resources dedicated to chip security.

However, in alternative embodiments, the SA pattern information can be sent from the manufacturer to the customer so that the customer performs the verification process.

In the illustrative embodiment, the scanned SA pattern data is received in a batch by the manufacturer, and the verification of the chip or package is carried out on an individual basis. In alternative embodiments, the scanning could be performed batchwise and then the verification could likewise be performed batchwise. Variations on batch and individual processing are used in embodiments of the invention. In step 807, the first scanned SA pattern is verified. In this embodiment, the client uses the enlarged SA pattern for verification as it is easier than the scanning electron microscopy (or other expensive microscopy) which is required to identify features in the original pattern at the nanoscale. If desired, an optional step(s) of scanning and verifying the original SA pattern at the chip level is carried out in step 809. The verification steps entail matching the expected features and feature locations from the manufacturer with the scanned data from the customer, step 811. If the scanned data does not match the manufacturer supplied data, interested parties such as the customer and manufacturer are notified, step 813.

If there are more SA patterns to be verified, step 815, the process returns to step 807. In an alternative embodiment, in reaction to the identification of an unverified pattern, more samples of the batch of chips or packages are made than originally intended to identify the extent of the counterfeiting problem in the shipment of parts. If there are no more patterns to be scanned, the verification process is complete, step 817.

Figure 9:
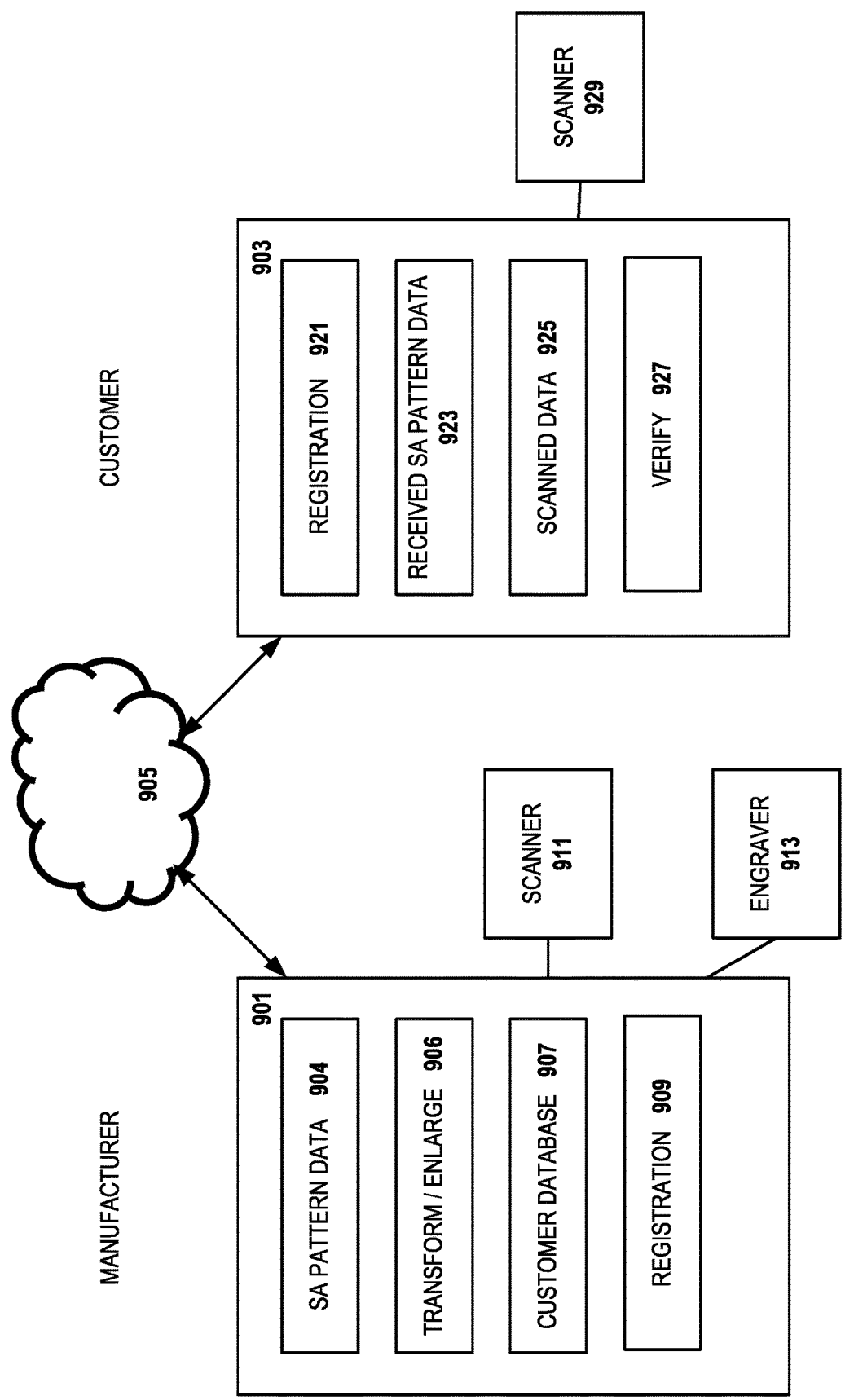
FIG. 9 is a system diagram using an SA marked integrated circuit to determine its authenticity in a verification operation.

FIG. 9 is a system diagram of a system which uses an SA marked integrated circuit to determine its authenticity in a verification operation. In this embodiment, the manufacturer system 901 is connected to the customer system 903 using the internet 905 via secure communication protocols. The manufacturer system 901 includes the SA pattern data 904, a transform/enlarge module 906, a customer database 907 and a registration module 909. The SA pattern data 904 as described about contains image data, feature and feature location data correlated with chip and package identification data. The transform/enlarge module 906 is used to make the enlarged image according to the transformation rules using the original SA pattern as a source. The enlarged image may be a simple enlargement, or it may be a transform in which the image is inverted, lines clarified and/or registration marks added. In these embodiments, the transform/enlarge module 906 would have computer code for image inversion, line clarification and registration mark addition. The result of transform/enlarge operation is stored in the SA pattern data 904, together with feature and feature location data for the enlarged image.

A customer database 907 is used to determine the identities of legitimate parties who can make requests for data access during the registration process. Also, chip and package identification information can be stored and associated with the customer and shipment information to forward the correct SA pattern data in response to a registered customer request. As SA pattern data is returned by customers, this information can also be used to track the manufactured chips through distribution channels. The registration module is used to register, authenticate and authorize legitimate customers of the manufacture for access to the SA pattern information.

Also shown attached to the manufacturing system 901 are scanner(s) 911 and engraver(s) 913. The scanner 911 is used to image the original SA pattern manufactured on the chip using the unguided SA process described above. The engraver 913 is a laser engraver in embodiments of the invention, but other engravers or printers are used in alternative embodiments of the invention. It is used to engrave an enlarged version of the SA pattern on the chip or package surface.

In the illustrated embodiment, the customer system 903 contains registration 921, received SA pattern data 923, scanned data 925 and verification 927 software modules stored customer system memory. The registration module 921 is used to register that customer with the manufacturer so that the SA pattern data may be obtained in some embodiments. As described above, in other embodiments of the invention, the registration module 921 is used to enable the customer to send scanned SA pattern data to the manufacturer for verification. The received SA pattern data store 923 is used to store the SA pattern data received from the manufacturer. The scanned data store 925 is used to store the SA pattern data which the customer obtains from their scanned chips and packages. In embodiments of the invention, the two data stores are combined into a single database. The verification module 927 is used to verify the chips and packages as belonging to the manufacturer. The operation of embodiments of the invention are described with reference to FIG. 8. Also shown attached to the customer system 903 is scanner 929 which is controlled by verification module 927 in some embodiments. Multiple scanners are used in embodiments (not pictured) either to speed the verification operation, or to scan different types of SA patterns, e.g., original, enlarged.

Figure 10:
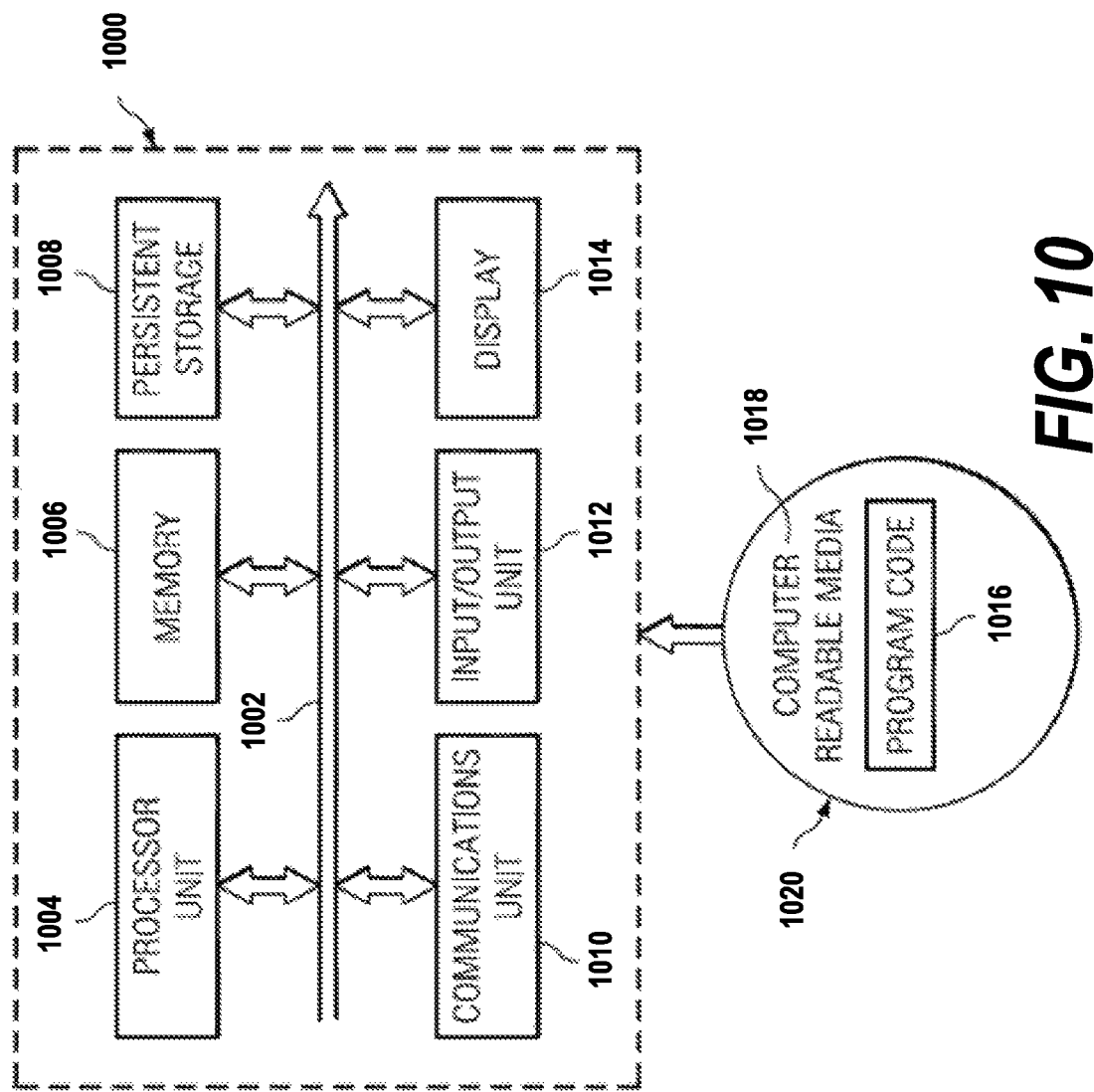
FIG. 10 is a block diagram of an exemplary data processing system is shown in which aspects of the illustrative embodiments may be implemented.

With reference now to FIG. 10, a block diagram of an exemplary data processing system is shown in which aspects of the illustrative embodiments may be implemented. Data processing system 1000 is an example of a computer, such as manufacturer system 901 or customer system in FIG. 9, in which computer usable code or instructions implementing the processes for illustrative embodiments of the disclosure may be located.

With reference now to FIG. 10, a block diagram of a data processing system is shown in which illustrative embodiments may be implemented. Data processing system 1000 is an example of a computer, in which computer-usable program code or instructions implementing the processes may be located for the illustrative embodiments. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a set of one or more processors or may be a multi-processor core, depending on the particular implementation. Further, processor unit 1004 may be implemented using one or more heterogeneous processor systems in which a main processor is present with secondary processors on a single chip. As another illustrative example, processor unit 1004 may be a symmetric multi-processor (SMP) system containing multiple processors of the same type.

Memory 1006 and persistent storage 1008 are examples of storage devices. A storage device is any piece of hardware that is capable of storing information either on a temporary basis and/or a permanent basis. Memory 1006, in these examples, may be, for example, a random access memory or any other suitable volatile or non-volatile storage device. Persistent storage 1008 may take various forms depending on the particular implementation. For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard and mouse. Further, input/output unit 1012 may send output to a printer. Display 1014 provides a mechanism to display information to a user.

Instructions for the operating system and applications or programs are located on persistent storage 1008. These instructions may be loaded into memory 1006 for execution by processor unit 1004. The processes of the different embodiments may be performed by processor unit 1004 using computer implemented instructions, which may be located in a memory, such as memory 1006. These instructions are referred to as program code, computer-usable program code, or computer-readable program code that may be read and executed by a processor in processor unit 1004. The program code in the different embodiments may be embodied on different physical or tangible computer-readable media, such as memory 1006 or persistent storage 1008.

Program code 1016 is located in a functional form on computer-readable media 1018 that is selectively removable and may be loaded onto or transferred to data processing system 1000 for execution by processor unit 1004. Program code 1016 and computer-readable media 1018 form computer program product 1020 in these examples. In one example, computer-readable media 1018 may be in a tangible form, such as, for example, an optical or magnetic disc that is inserted or placed into a drive or other device that is part of persistent storage 1008 for transfer onto a storage device, such as a hard drive that is part of persistent storage 1008. In a tangible form, computer-readable media 1018 also may take the form of a persistent storage, such as a hard drive, a thumb drive, or a flash memory that is connected to data processing system 1000. The tangible form of computer-readable media 1018 is also referred to as computer-recordable storage media. In some instances, computer-recordable media 1018 may not be removable.

Alternatively, program code 1016 may be transferred to data processing system 1000 from computer-readable media 1018 through a communications link to communications unit 1010 and/or through a connection to input/output unit 1012. The communications link and/or the connection may be physical or wireless in the illustrative examples. The computer-readable media also may take the form of non-tangible media, such as communications links or wireless transmissions containing the program code. The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. As one example, a storage device in data processing system 1000 is any hardware apparatus that may store data. Memory 1006, persistent storage 1008, and computer-readable media 1018 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006 or a cache such as found in an interface and memory controller hub that may be present in communications fabric 1002.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 10 may vary depending on the implementation. Other internal hardware or peripheral devices, such as flash memory, equivalent non-volatile memory, or optical disk drives and the like, may be used in addition to or in place of the hardware depicted in FIG. 10. Also, the processes of the illustrative embodiments may be applied to a multiprocessor data processing system, other than the SMP system mentioned previously, without departing from the spirit and scope of the disclosed subject matter.

The present invention has many advantages over the prior art. The embodiments of the invention increase security through a unique SA pattern or "fingerprint" that is created onto selected chips, chip locations and processing layers. An unguided SA process generates random and unique patterns which the invention uses for integrated chip security. The unique SA patterns are captured, analyzed, transformed and enlarged in embodiments of the invention. The enlarged versions of the SA patterns allow easier customer verification. In embodiments of the invention, rather than verifying against an entire image of the SA pattern, a set of features and feature locations are used to efficiently store and recognize each unique pattern. Embodiments of the invention utilize SA patterns are attached to chips and/or packaging during manufacturing. Thus, a very clear and controlled attachment of an identifying pattern to a chip is possible.

While only one or a limited number of features are illustrated in the drawings, those ordinarily skilled in the art would understand that many different types of features could be simultaneously formed with the embodiment herein and the drawings are intended to show simultaneous formation of multiple different types of features. However, the drawings have been simplified to only show a limited number of features for clarity and to allow the reader to more easily recognize the different features illustrated. This is not intended to limit the invention because, as would be understood by those ordinarily skilled in the art, the invention is applicable to structures that include many of each type of feature shown in the drawings.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having described our invention, what we now claim is as follows:

1. A method for verifying a semiconductor product, comprising:
   receiving an image of a self-assembly (SA) pattern on a substrate from a scanner, wherein the SA pattern has been initially created using a block copolymer (BCP) which has been annealed on the substrate;
   storing data from the SA pattern in a computer system; and
   associating the SA pattern data with the semiconductor product;
   wherein the SA pattern is an information carrying security mark having a set of features with corresponding locations within the information carrying security mark which uniquely identify the semiconductor product.

2. The method as recited in claim 1, wherein the substrate is a semiconductor chip and the method further comprises:
   receiving an enlarged SA pattern generated from the SA pattern;
   storing SA pattern data about the enlarged SA pattern in the computer memory; and
   associating the SA pattern data about the enlarged SA pattern with the semiconductor product.

3. The method as recited in claim 2, wherein the program code, operative to generating an enlarged SA pattern from the SA pattern further comprises:
   inverting the SA pattern image;
   clarifying scanned lines from the SA pattern image; and
   adding a registration mark to the enlarged SA pattern.

4. The method as recited in claim 1, wherein the SA pattern data is a set of features and feature locations from the SA image and the method further comprises:
   receiving a set of features and feature locations from a customer;
   verifying the received set of features and feature locations as associated with the semiconductor product by matching the received set of features and feature locations with the stored features and feature locations.

5. The method as recited in claim 4, further comprising determining whether the customer is in a customer database and authorized to make requests.

6. The method as recited in claim 1, further comprising associating the SA pattern data with model and serial numbers information.

7. A method for verifying a semiconductor product comprising:
   scanning a self-assembly (SA) pattern on a substrate, wherein the SA pattern has been initially created using a block copolymer (BCP) which has been annealed on the substrate;
   storing data from the SA pattern in a computer system;
   sending the stored data from the SA pattern to a verifying application; and wherein the SA pattern is an information carrying security mark having a set of features with corresponding locations within the information carrying security mark which uniquely identify the semiconductor product.

8. The method as recited in claim 7, wherein the substrate is a semiconductor chip and the initial SA pattern has been created on an upper, physically observable layer.

9. The method as recited in claim 7, wherein the substrate is a semiconductor chip and the method further comprises:
converting a scanned image of the SA pattern into SA pattern data, wherein the SA pattern data comprises a set of features, feature type and feature location data; and
wherein the stored data from the SA pattern is the feature data.

10. The method as recited in claim 9, further comprising:
registering with the verifying application prior to sending the stored data from the SA pattern to a verifying application; and
scanning a plurality of SA patterns on the semiconductor product.

11. The method as recited in claim 7, further comprising receiving verification from the verification application that the scanned semiconductor product matches a semiconductor product shipped to a customer.

12. The method as recited in claim 11, wherein the set of features are selected from the group consisting of line end features, fork features and short-line features.

13. The method as recited in claim 7, further comprising:
receiving a set of features and feature locations from the verifying application, the set of features and features locations corresponding to a semiconductor product shipped to a customer; and
verifying the scanned semiconductor product using the received set of features and feature locations associated with the shipped semiconductor product.

14. The method as recited in claim 13, wherein the set of features and feature locations are stored efficiently using a sparse matrix representation and wherein the received set of features and feature locations are used to verify the scanned semiconductor product against a SA pattern database using an elastic string match utilizing an edit distance metric to compare the stored set of features and feature locations with the received set of features and feature locations.

15. Apparatus, comprising:
a processor;
a computer memory holding computer program instructions executed by the processor, the computer program instructions comprising:
program code, operative to receive an image of a self-assembly (SA) pattern on a substrate from a scanner, wherein the SA pattern has been initially created using a block copolymer (BCP) which has been annealed on the substrate;
program code, operative to store data from the SA pattern in a computer system; and
program code, operative to associate the SA pattern data with the semiconductor product;
wherein the SA pattern is an information carrying security mark having a set of features with corresponding locations within the information carrying security mark which uniquely identify the semiconductor product.

16. The apparatus recited in claim 15, wherein the substrate is a semiconductor chip and the computer program instructions further comprise:
program code, operative to receiving an enlarged SA pattern generated from the SA pattern;
program code, operative to store SA pattern data about the enlarged SA pattern in the computer memory; and
program code, operative to associate the SA pattern data about the enlarged SA pattern with the semiconductor product.

17. The apparatus as recited in claim 16, wherein the program code, operative to generating an enlarged SA pattern from the SA pattern further comprises:
program code, operative to invert the SA pattern image;
program code, operative to clarify scanned lines from the SA pattern image; and
program code, operative to add a registration mark to the enlarged SA pattern.

18. The apparatus as recited in claim 15, wherein the SA pattern data is a set of features and feature locations from the SA image and the computer program instructions further comprise:
program code, operative to receive a set of features and feature locations from a customer;
program code, operative to verify the received set of features and feature locations as associated with the semiconductor product by matching the received set of features and feature locations with the stored features and feature locations.

19. The apparatus as recited in claim 15, further comprising determining whether the customer is in a customer database and authorized to make requests.

20. The apparatus as recited in claim 15 further comprising program code operative to associate the SA pattern data with model and serial numbers information.

* * * * *